US012584616B2

(12) United States Patent
Saline et al.

(10) Patent No.: US 12,584,616 B2
(45) Date of Patent: Mar. 24, 2026

(54) MOVABLE ELECTRICAL FIXTURES

(71) Applicant: Hubbell Incorporated, Shelton, CT (US)

(72) Inventors: Lon Benjamin Saline, Gilbert, AZ (US); Riley James Laughlin, Scottsdale, AZ (US)

(73) Assignee: Hubbell Incorporated

( * ) Notice: Subject to any disclaimer, the term of this patent is extended or adjusted under 35 U.S.C. 154(b) by 285 days.

(21) Appl. No.: 18/301,302

(22) Filed: Apr. 17, 2023

(65) Prior Publication Data

US 2023/0383935 A1 Nov. 30, 2023

Related U.S. Application Data

(63) Continuation of application No. PCT/US2021/052497, filed on Sep. 29, 2021.

(60) Provisional application No. 63/094,482, filed on Oct. 21, 2020.

(51) Int. Cl.
| | |
|---|---|
| *F21V 21/30* | (2006.01) |
| *F21V 23/00* | (2015.01) |
| *H02G 3/08* | (2006.01) |

(52) U.S. Cl.
CPC ............ *F21V 21/30* (2013.01); *F21V 23/002* (2013.01); *H02G 3/081* (2013.01); *H02G 3/088* (2013.01)

(58) Field of Classification Search
CPC ....... F21V 21/30; F21V 23/002; H02G 3/081; H02G 3/088; H02G 3/086
See application file for complete search history.

(56) References Cited

U.S. PATENT DOCUMENTS

| | | | | |
|---|---|---|---|---|
| 4,475,226 | A | * 10/1984 | Greenberg | ............... H04R 3/12 |
| | | | | 362/370 |
| 4,543,007 | A | 9/1985 | Quiogue | |
| RE39,084 | E | * 5/2006 | Hagen | ..................... F21V 19/02 |
| | | | | 362/418 |
| 7,494,251 | B1 | * 2/2009 | Kira | ........................ F21V 29/15 |
| | | | | 362/418 |
| 8,915,609 | B1 | 12/2014 | Shah et al. | |
| 10,190,757 | B2 | * 1/2019 | Erdener | .................. F21S 8/081 |
| 10,415,809 | B2 | 9/2019 | Thomas | |
| 2017/0276337 | A1 | 9/2017 | Thomas | |
| 2018/0031215 | A1 | 2/2018 | Erdener et al. | |
| 2018/0332204 | A1 | 11/2018 | Chien | |

* cited by examiner

*Primary Examiner* — Vanessa Girardi
(74) *Attorney, Agent, or Firm* — Ruggiero McAllister & McMahon LLC; Edward L McMahon

(57) ABSTRACT

An electrical fixture is provided that includes a mounting portion, an emitting portion, a connection, and a passage. The mounting portion has a first chamber and an opening passing from the first chamber to an exterior of the electrical fixture. The emitting portion has a second chamber. The connection secures the mounting and emitting portions to one another for movement with respect to one another. The passage has a first end that begins in the first chamber, an extension passing from the first chamber through the connection without passing through the exterior of the electrical fixture, and a second end that terminates in the second chamber.

21 Claims, 15 Drawing Sheets

MOVABLE ELECTRICAL FIXTURES

CROSS REFERENCE TO RELATED APPLICATIONS

This application is a continuation of International Application filed PCT/US21/52497 filed Sep. 29, 2021, which claims benefit of U.S. Application 63/094,482 filed Oct. 21, 2020, the entire contents of all of which are incorporated herein by reference.

BACKGROUND

1. Field of the Invention

The present disclosure is related to movable electrical fixtures. More particularly, the present disclosure is related to movable electrical fixtures.

2. Description of Related Art

Electrical fixtures such as, but not limited to, lighting fixtures, audio fixtures, electrical outlets, and others are often configured with a mounting portion and an emitting portion that is pivotally secured to the mounting portion by a pivot connection. The mounting portion allows the fixture to be secured or otherwise mounted to a surface or structure. The pivot connection allows for adjustment of a direction of the emitting portion with respect to the mounting portion to change a direction of light, sound, electricity, and others emitted from the emitting portion.

In some implementations, it is desired for the individual fixtures to be wired to one another in a serial or daisy chain manner. In this manner, a single conductor can electrically connect a number of fixtures serially to a single control source.

Many prior art electrical fixtures provide the desired pivoting functionality, but are structured in a way that makes it difficult for tradesman and "do it yourselfers" to form the necessary conductive connections, increasing installation time and difficulty.

Additionally, prior art electrical fixtures often require either junction boxes that lack aesthetic appeal and/or increase the difficult to form the necessary conductive connections. Further, prior art electrical fixtures that address one or more of these issues are generally difficult to adjust the pivoting functionality and/or result in conductive connections that can fail with repeated pivoting.

Accordingly, it has been determined by the present disclosure that there is a continuing need for electrical fixtures that overcome, alleviate, and/or mitigate one or more of the aforementioned and other deleterious effects of prior art fixtures.

SUMMARY

The present disclosure advantageously provides electrical fixtures that include integral junction boxes in the mounting portion that allows multiple fixtures to be operatively connected to one another in a serial manner, are aesthetically pleasing, and allow easy and reliable pivoting and/or rotational adjustment.

An electrical fixture is provided that includes a mounting portion, an emitting portion, a connection, and a passage. The mounting portion has a first chamber and an opening passing from the first chamber to an exterior of the electrical fixture. The emitting portion has a second chamber. The connection secures the mounting and emitting portions to one another for movement with respect to one another. The passage has a first end that begins in the first chamber, an extension passing from the first chamber through the connection without passing through the exterior of the electrical fixture, and a second end that terminates in the second chamber.

In some embodiments either alone or together with any one or more of the aforementioned and/or after-mentioned embodiments, the electrical fixture can include an emission source in the second chamber. The emission source can be a light source and/or a sound source and/or a power source.

In some embodiments either alone or together with any one or more of the aforementioned and/or after-mentioned embodiments, the emission source is a light source selected from a group consisting of an incandescent lamp, a fluorescent lamp, a light emitting diode, and any combinations thereof.

In some embodiments either alone or together with any one or more of the aforementioned and/or after-mentioned embodiments, the connection is selected from a group consisting of: a pivoting connection allowing movement of the mounting and emitting portions with respect to one another about a pivot axis; a rotational connection allowing movement of the mounting and emitting portions with respect to one another about a rotational axis; and any combinations thereof.

In some embodiments either alone or together with any one or more of the aforementioned and/or after-mentioned embodiments, the first chamber can have an internal volume of between 5 and 100 cubic inches.

In some embodiments either alone or together with any one or more of the aforementioned and/or after-mentioned embodiments, the mounting portion, the emitting portion, the pivot connection, and the passage are weather tight.

In some embodiments either alone or together with any one or more of the aforementioned and/or after-mentioned embodiments, the mounting portion and the emitting portion have a shape selected from a group consisting of: a cylindrical shape, an ovoid shape, a polygonal shape, a curvilinear shape, an organic shape, a primitive shape, and any combinations thereof.

In some embodiments either alone or together with any one or more of the aforementioned and/or after-mentioned embodiments, the mounting portion includes an upper section and a lower section. The lower section has the first chamber and the opening passing from the first chamber to the exterior of the electrical fixture.

In some embodiments either alone or together with any one or more of the aforementioned and/or after-mentioned embodiments, the connection can include a pivoting connection and/or a rotational connection. The pivoting connection allows movement of the upper section of the mounting portion and the emitting portion with respect to one another about a pivot axis. The rotational connection allows movement of the upper and lower sections of mounting portions with respect to one another about a rotational axis.

In some embodiments either alone or together with any one or more of the aforementioned and/or after-mentioned embodiments, the mounting portion, the emitting portion, and the pivot connection are configured so that the pivot connection is substantially concealed by the mounting and emitting portions.

In some embodiments either alone or together with any one or more of the aforementioned and/or after-mentioned embodiments, the mounting portion has a first section of the pivot connection and the emitting portion has a second section of the pivot connection.

In some embodiments either alone or together with any one or more of the aforementioned and/or after-mentioned embodiments, the pivot connection can include intermesh-ing gears at the first and second sections that define a plurality of discrete pivotal positions about the pivot axis.

In some embodiments either alone or together with any one or more of the aforementioned and/or after-mentioned embodiments, the first section and second sections each include inner mating surfaces and each include outer mating surfaces.

In some embodiments either alone or together with any one or more of the aforementioned and/or after-mentioned embodiments, the electrical fixture can further include a gasket positioned between the inner mating surfaces of the first and second sections.

In some embodiments either alone or together with any one or more of the aforementioned and/or after-mentioned embodiments, the inner mating surface of the first section is spaced along the pivot axis from the outer mating surface of the first section. The inner mating surface of the second section is spaced along the pivot axis from the outer mating surface of the second section.

In some embodiments either alone or together with any one or more of the aforementioned and/or after-mentioned embodiments, the electrical fixture can include a threaded fastener in the passage along the pivot axis. The threaded fastener passes through the passage and applies a force on the outer mating surfaces of the first and second sections to urge the inner mating surfaces of the first and second sections against one another.

In some embodiments either alone or together with any one or more of the aforementioned and/or after-mentioned embodiments, the upper section of the mounting portion has a first region of the rotational connection and the lower section of the mounting portion has a second region of the rotational connection.

In some embodiments either alone or together with any one or more of the aforementioned and/or after-mentioned embodiments, the first and second regions include inter-meshing gears defining a plurality of discrete positions about the rotation axis.

In some embodiments either alone or together with any one or more of the aforementioned and/or after-mentioned embodiments, the rotational connection further includes a threaded fastener passing along the rotation axis and a biasing member positioned to normally bias the upper and lower sections of the mounting portion into contact with one another.

A method of serially connecting electrical fixtures is provided. The method includes providing a first electrical fixture having a mounting portion, an emitting portion, and one or more connections configured to allow movement about a pivot axis and/or a rotational axis; passing a con-ductor and a second conductor into a chamber of the mounting portion from an exterior of the first electrical fixture; passing a third conductor from the chamber of the mounting portion to the emitting portion through the one or more connections without passing through the exterior; interconnecting the first, second, and third conductors to each other in the chamber; and interconnecting an end of the second conductor that is exterior to the wiring chamber to a second electrical fixture.

The above-described and other features and advantages of the present disclosure will be appreciated and understood by those skilled in the art from the following detailed descrip-tion, drawings, and appended claims.

DESCRIPTION OF THE DRAWINGS

FIGS. 17a-7c show various attributes of the rotational connection of the fixture of FIG. 13.

DETAILED DESCRIPTION

Figures 1, 2:
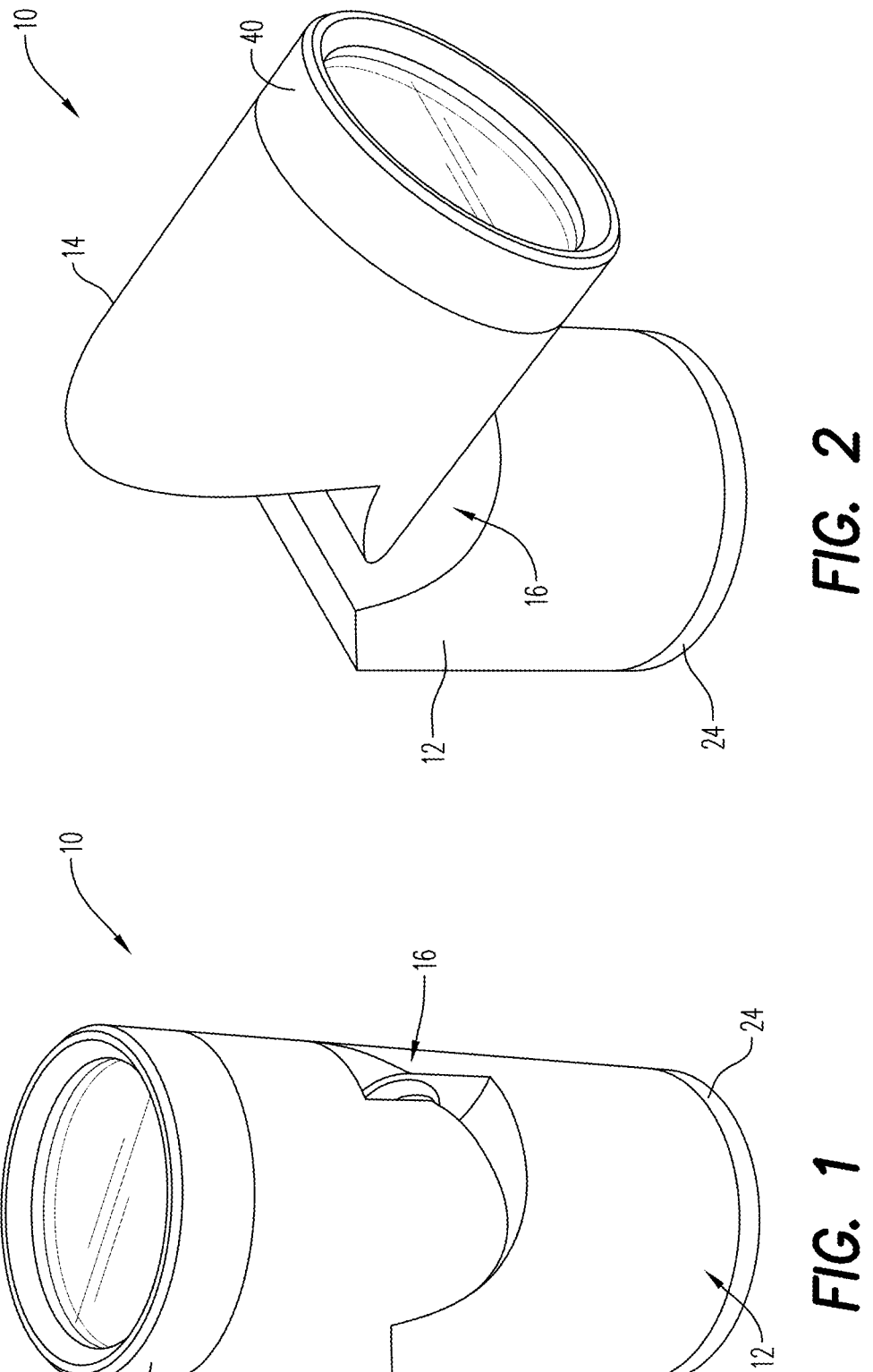
FIG. 1 is a perspective view of an exemplary embodiment of an electrical fixture according to the present disclosure in a first position.
FIG. 2 is a perspective view of the fixture of FIG. 1 in a second position.

Referring to the drawings and in particular with simulta-neous reference to FIGS. 1-9, an exemplary embodiment of an electrical fixture according to the present disclosure is shown and is generally referred to by reference numeral 10.

Fixture 10 includes a mounting portion 12, an emitting portion 14, and a pivot connection 16 that pivotally connects the portions to one another. Emitting portion 14 can be any configured to emit—and in some instances receive—any desired signal such as light, sound, electricity, wireless internet in the form of a WIFI or Bluetooth emitter/antenna/repeater, female connectors in the form of electrical outlets, ethernet connectors, coaxial connectors, USB connectors, any combinations thereof.

Advantageously, fixture 10 is configured to selective movement amount a number of different positions so as to change a position of emitting portion 14 with respect to mounting portion 12. Pivot connection 16 can be configured to provide adjustment about a single pivot axis ($P_A$) between the position of mounting and emitting portions 12, 14. Pivot connection 16 can provide a range of adjustment between portions 12, 14 of up to 180 degrees, more preferably up to 90 degrees, and any subranges therebetween.

Figures 3, 4:
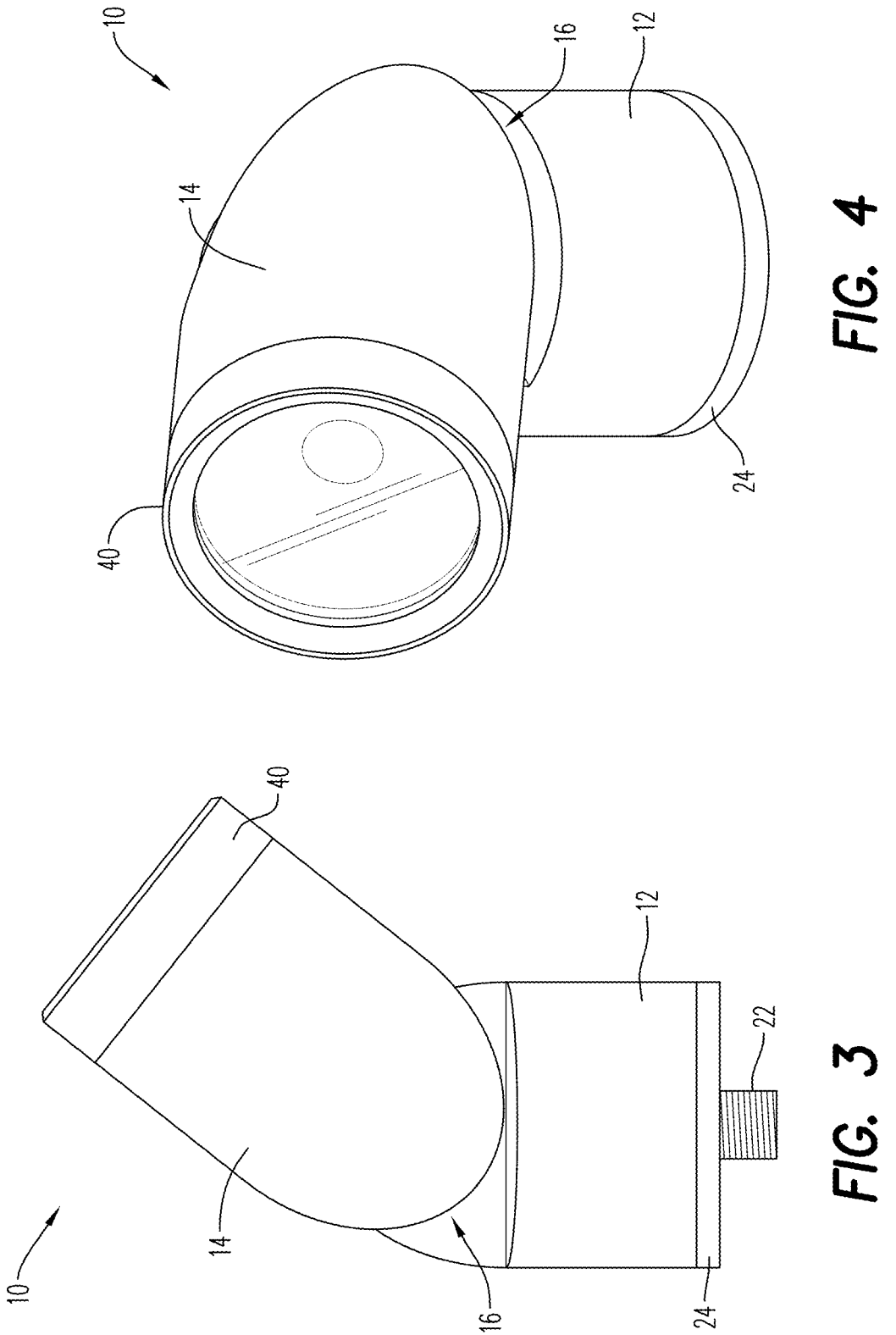
FIGS. 3-4 are perspective views of the fixture of FIG. 1 in a third position, which is between the first and second positions.
Figure 5A:
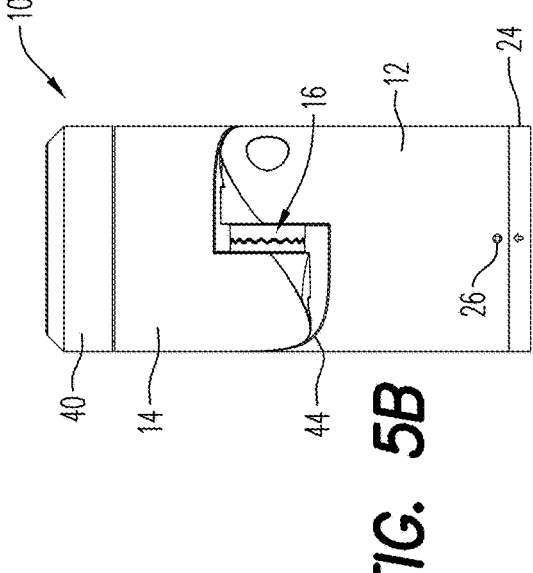
FIGS. 5a-5d are side views of the fixture of FIG. 1, rotated ninety degrees from one another.
Figure 5B:
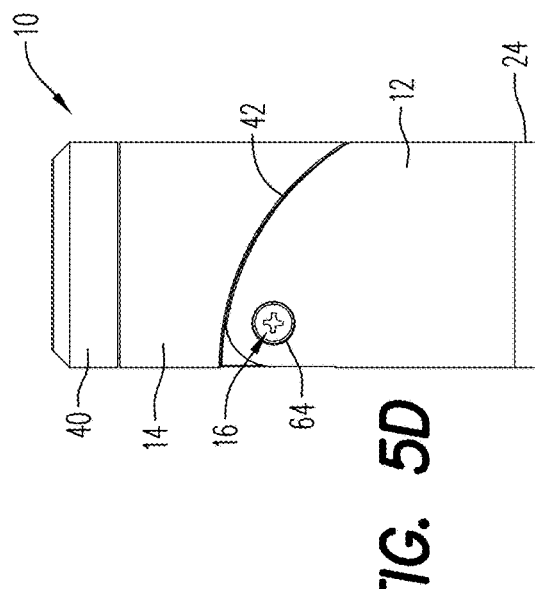
Figure 5C:
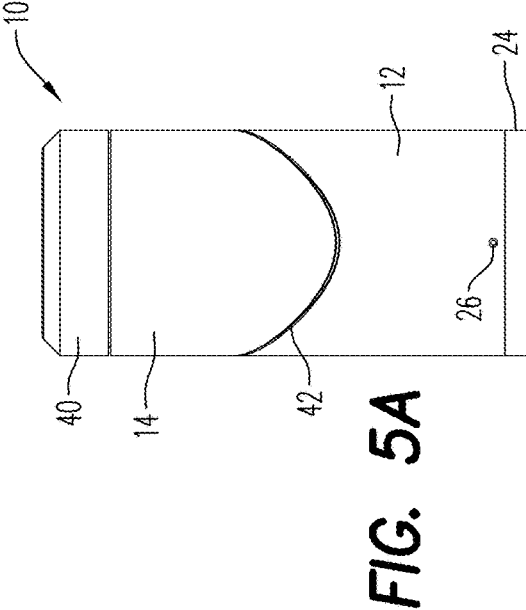
Figure 5D:
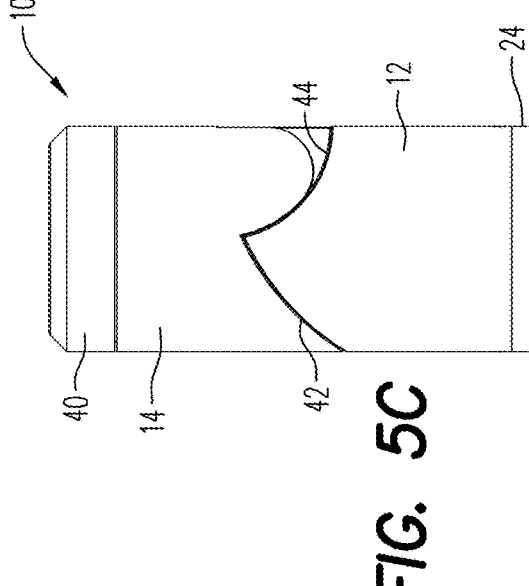
Figures 6, 7A, 7B:
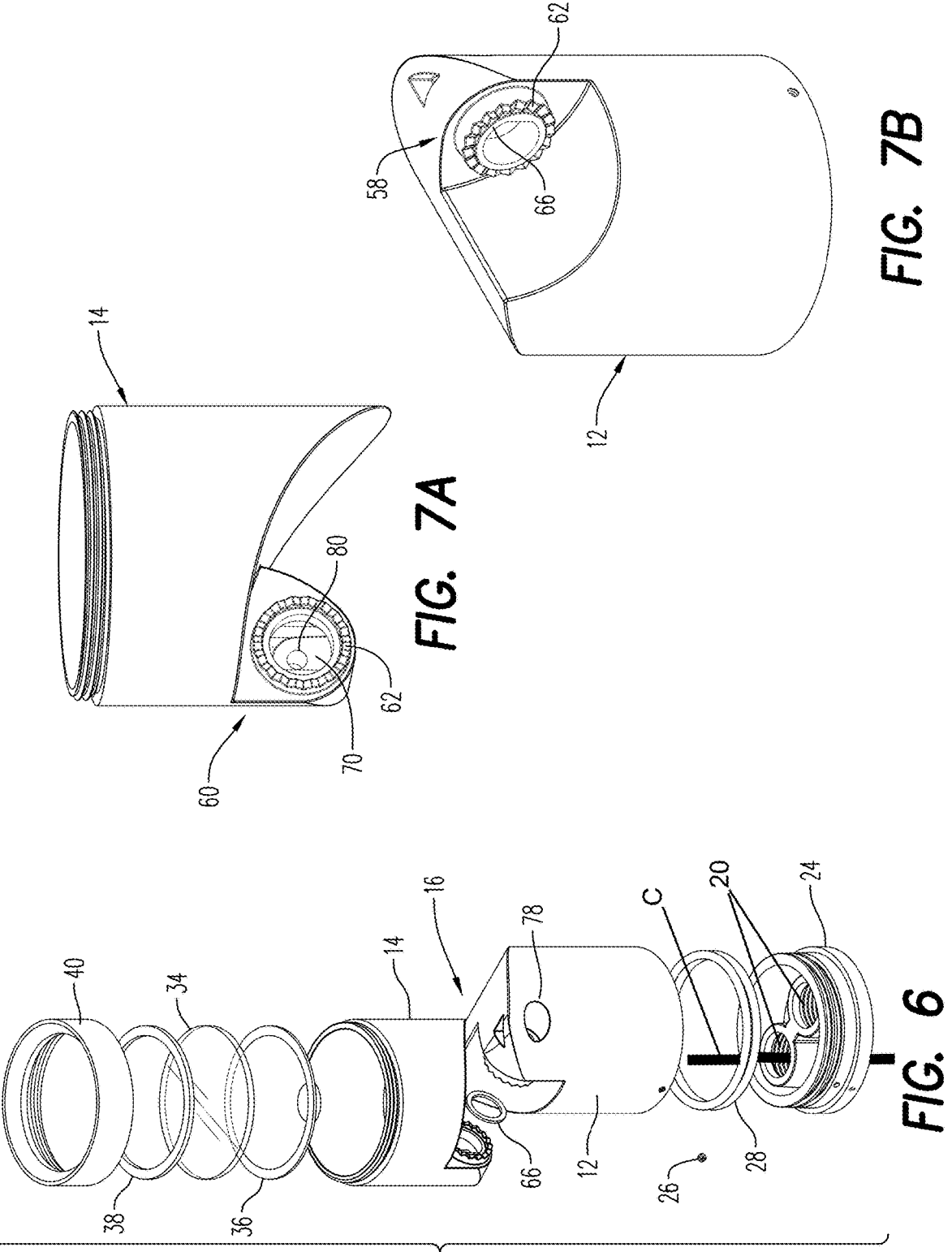
FIG. 6 is an exploded view of the fixture of FIG. 1.
FIGS. 7a and 7b are perspective views of portions of the pivot connection of FIG. 1.
Figure 9:
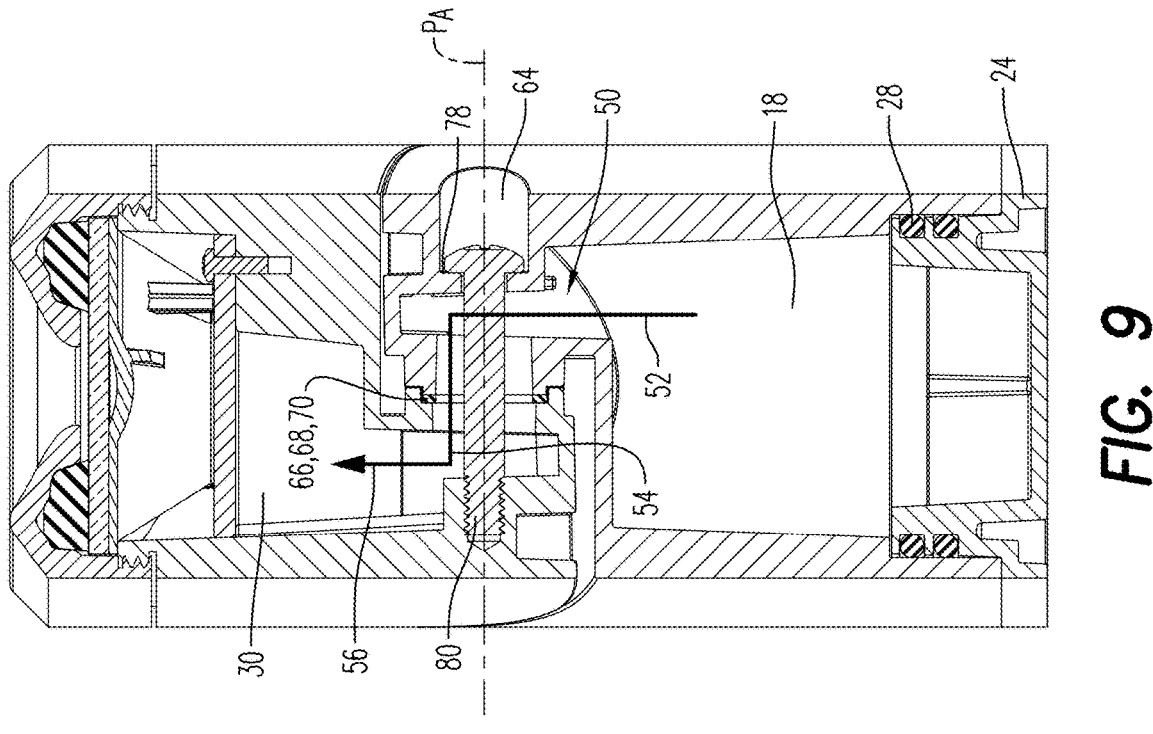
FIG. 9 is a sectional side view of the fixture of FIG. 1.
Figure 8:
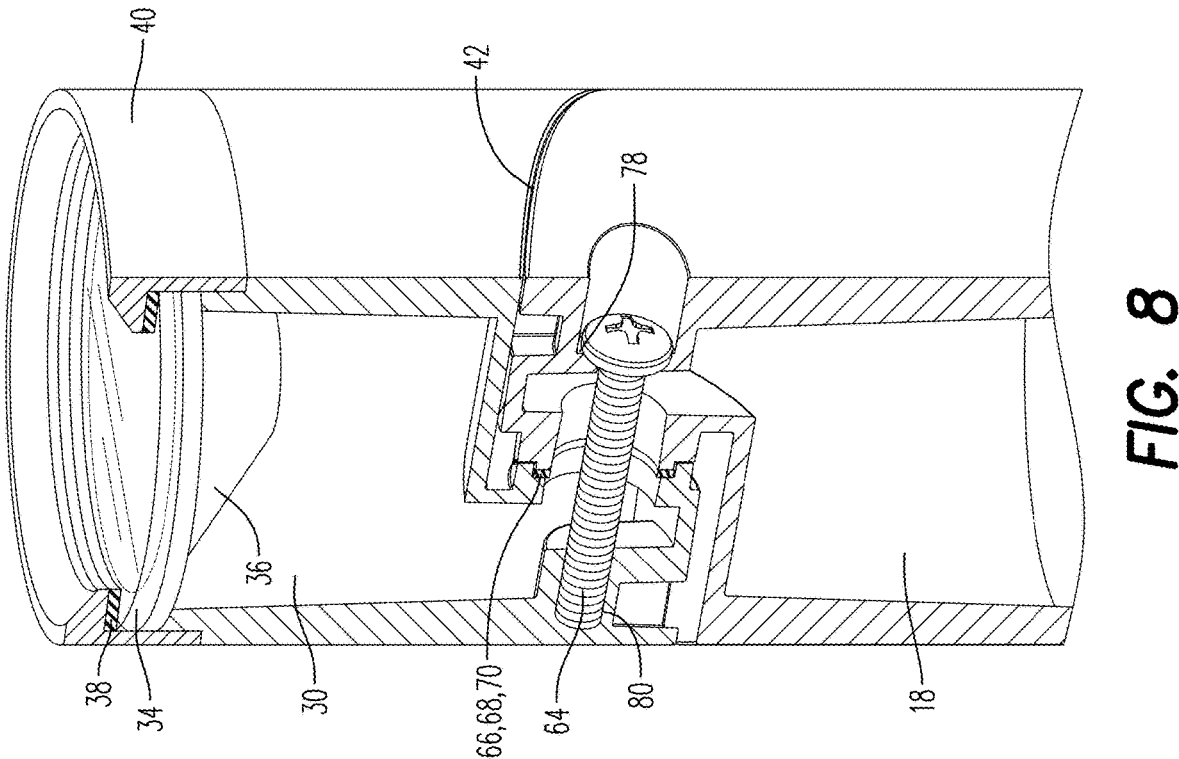
FIG. 8 is a partial sectional perspective view of the fixture of FIG. 1.

Fixture 10 is shown in FIG. 1 in a first position, in FIG. 2 in a second position, and in FIGS. 3-4 in a third position that is between the first and second position. In this embodiment, fixture 10 has pivot connection 16 configured to provide a range of adjustment between the first and second positions of about 90 degrees.

Mounting portion 12 includes a wiring chamber 18 that is positioned and configured to allow fixture 10 to be wired in a serial or daisy chain manner to one or more other fixtures.

Chamber 18 provides a space inside of mounting portion 12 of sufficient size to allow for connecting of multiple signal conductors (C) to one another within the chamber (one shown). The signal conductors (C) can include electrical power wires, speaker wires, line voltage power lines, low voltage power lines, internet communication lines, and any combinations thereof.

In some embodiments, chamber 18 has a volume sufficient to accommodate at least six American Wire Gauge (AWG) wires. In other embodiments, chamber 18 can have an internal volume of between 5 and 100 cubic inches, more preferably between 10 and 30 cubic inches, with about 20 cubic inches being most preferred, and any subranges therebetween.

Here, mounting portion 12 includes one or more openings 20 (two shown) that passes through a wall of the mounting portion between an exterior of fixture 10 into chamber 18. Opening 20 can, in some embodiments, provide a weather tight seal against conductors (C) passing therethrough in any known manner so chamber 18 protects wirings made within the chamber from water and other elements.

Mounting portion 12 can have any desired structure sufficient to secure fixture 10 to the desired surface. For example, in some embodiments where fixture 10 is configured as landscape lighting fixture, mounting portion 12 can include a member 22 shown in FIG. 3 to secure the fixture in the ground.

In other embodiments, mounting portion 12 can include a bottom cap 24 that is removably secured thereto in any desired manner. In the illustrated embodiment, cap 24 is shown secured to mounting portion 12 by a set screw 26. In some embodiments, fixture 10 can further include one or more gaskets 28 (two shown) that provide a weather tight seal to chamber 18. Member 20, when present, can be on cap 24 or any other area of mounting portion 12.

In various contemplated embodiments, emitting portion 14 can be a wireless speaker and/or a light source that receives power and/or other signals from the conductor.

In the illustrated embodiment, emitting portion 14 houses an emitter receiving chamber that receives an emission source 32. Source 32 can include any sound or light source. In embodiments where source 32 is a light source, it is contemplated for the source to be any source such as, but not limited to, incandescent lamps, fluorescent lamps, light emitting diodes (LED's), and combinations thereof.

Further, emitting portion 14 can include one or more features of such emission sources. In the example where source 32 is a light source, emitting portion 14 can include features such as, but not limited to, a lens cover 34, a reflector 36, a seal 38, a cap 40, a bulb holder (not shown), a focusing device (not shown), and/or others.

In some embodiments, fixture 10 can be a Bollard light where mounting portion 12 is a cylindrical post and emitting portion 14 has a corresponding cylindrical shape so that, in the first position of FIG. 1, the fixture has a general appearance of a post or cylindrical upright.

Also, fixture 10 can in some embodiments be configured so that pivot connection 16 is substantially concealed by mounting and emitting portions 12, 14. By "substantially concealed", it is meant that pivot connection 16 is revealed along the circumference of fixture 10 between about 0 degrees and 45 degrees, more preferably between 3 to 40 degrees, with between 5 and 25 degrees being most preferred, and any subranges therebetween.

Examples of which can be seen in the side views of FIGS. 5a-5d. While a reveal line 42 and/or gaps 44 between portions 12, 14 extends around a circumference of fixture 10 to varying amounts, pivot connection 16 is substantially concealed—providing a pleasing aesthetic appearance.

Advantageously, fixture 10 includes a passage 50 that has a first end 52 that begins in wiring chamber 18, an extension 54 passing from the wiring chamber through pivot connection 16 without passing through the exterior of the fixture, and a second end 56 that terminates in emitter receiving chamber 30.

Passage 50 is defined by fixture 10 through pivot connection 16 and is described in more detail with reference to FIGS. 6-9.

Mounting portion 12 has a first section 58 of pivot connection 16 and emitting portion 14 has a second section 60 of the pivot connection.

In some embodiments, first and second sections 58, 60 have intermeshing gears 62, which define a plurality of discrete pivotal positions about pivot axis (P$_A$). Of course, any desired interconnection between the first and second sections 58, 60 is contemplated by the present disclosure.

Passage 50 is sized to receive a threaded fastener 64 along pivot axis (P$_A$). Fastener 64 can be selectively loosened so that pivot connection 16 can allow portions 12, 14 to pivot with respect to one another or selectively tightened so that the pivot connection prevents the portions 12, 14 from pivoting with respect to one another.

In some embodiments, fixture 10 can further include a gasket 66 positioned between inner mating surfaces 68, 70 of first and second sections 58, 60. Gasket 66 can provide a weather tight seal and/or can provide for reduced friction between sections 58, 60 at surfaces 68, 70.

Thus in some embodiments either with or without gasket 66, passage 50 can define a weather tight chamber so that wiring chamber 18 and emitter receiving chamber 30 remain protected from the ingress of water and other elements at pivot connection 16.

Passage 50 is defined, at least in part, by spacing of inner mating surfaces 68, 70 along pivot axis (P$_A$) from outer mating surfaces 78, 80, respectively, on which bolt 64 acts. Passage 50 is further defined, at least in part, by having a larger dimension (e.g., diameter) in a direction normal to pivot axis (P$_A$) than that of bolt 64.

Stated differently, first section 58 has inner mating surface 68 spaced along pivot axis (P$_A$) from outer mating surface 78, while second section 60 has inner mating surface 70 spaced along the pivot axis (P$_A$) from outer mating surface 80. Fastener 64 passes through passage 50 and applies a force on outer mating surfaces 78, 80 to urge inner mating surfaces 68, 70 against one another.

The separation of inner and outer mating surfaces from one another has been found by the present disclosure to provide sufficient spacing within passage 50 to allow conductors to pass from wiring chamber 18 of mounting portion 12 to emitter receiving chamber 30 of emitting portion 14. Passage 50 is sized to prevent the conductor from catching or binding on pivot connection 16, which mitigates premature failure of the conductor due to repeating pivoting of fixture 10.

During installation of a single fixture 10, a user can secure the fixture to a surface via mounting portion 12 and pass a conductor into chamber 18 of the mounting portion. This conductor can be operatively coupled to emission source 32 in chamber 30 through passage 50 in any known manner.

When multiple fixtures 10 are installed and are serially connected to one another, the user can secure the fixtures to surfaces via mounting portion 12. The first fixture 10 in the installation can have a conductor passed into chamber 18 of the mounting portion of that first fixture. This conductor can be operatively coupled to emission source 32 in chamber 30 of the first fixture through passage 50 in any known manner. Additionally, a second conductor can be passed from chamber 18 of the mounting portion of that first fixture back out of the first fixture to a second fixture for operative coupling of that second fixture.

It should be recognized that fixture 10 is described above by way of example only as having a cylindrical shape. Of course, it is contemplated by the present disclosure for fixture 10 to have any desired shape such as, but not limited to, cylindrical shapes, ovoid shapes, polygonal shapes, curvilinear shapes, organic shapes, primitive shapes, and any combinations thereof.

Figure 10:
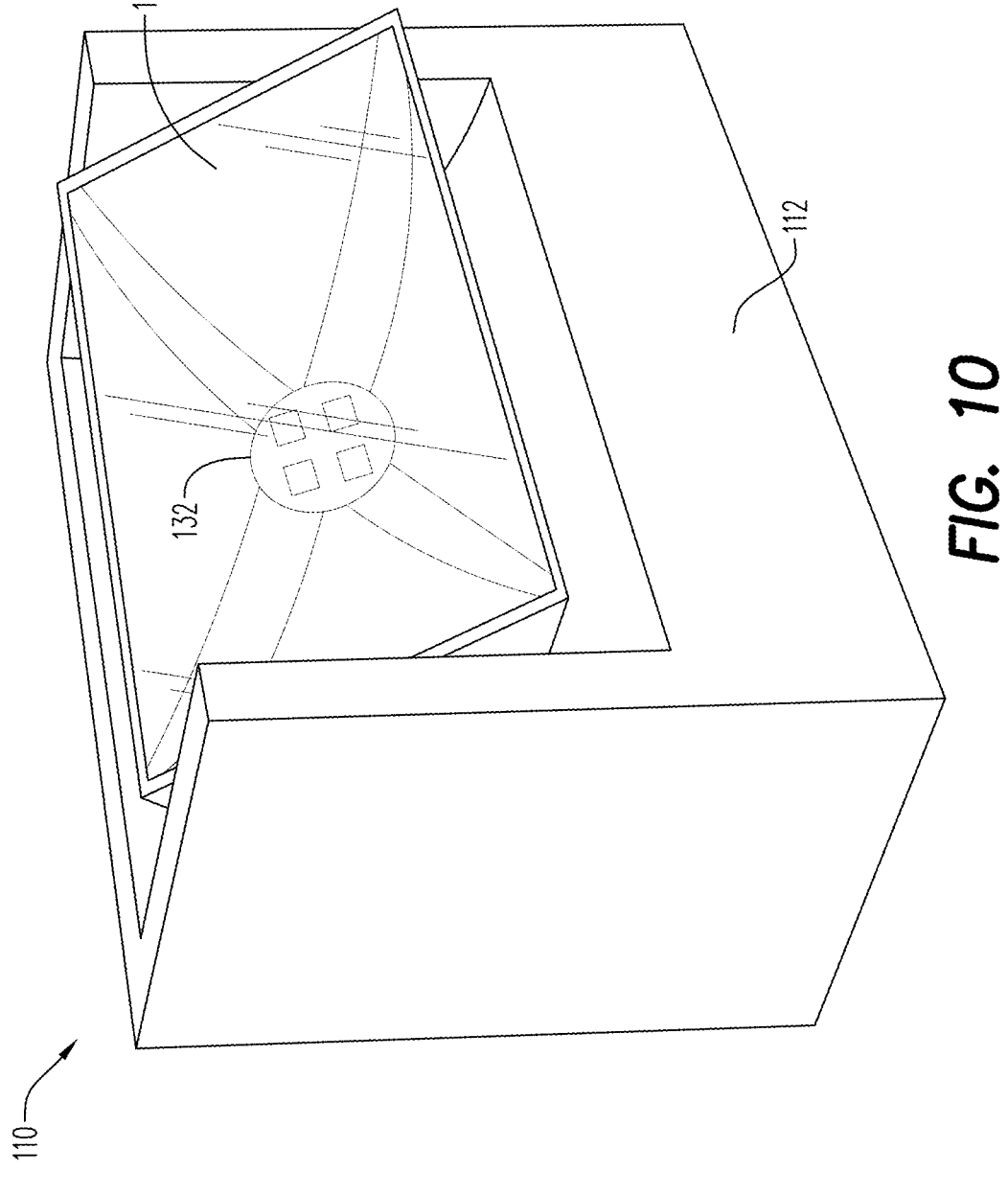
FIG. 10 is a perspective view of an alternate exemplary embodiment of an electrical fixture according to the present disclosure in a second position.
Figures 11, 12:
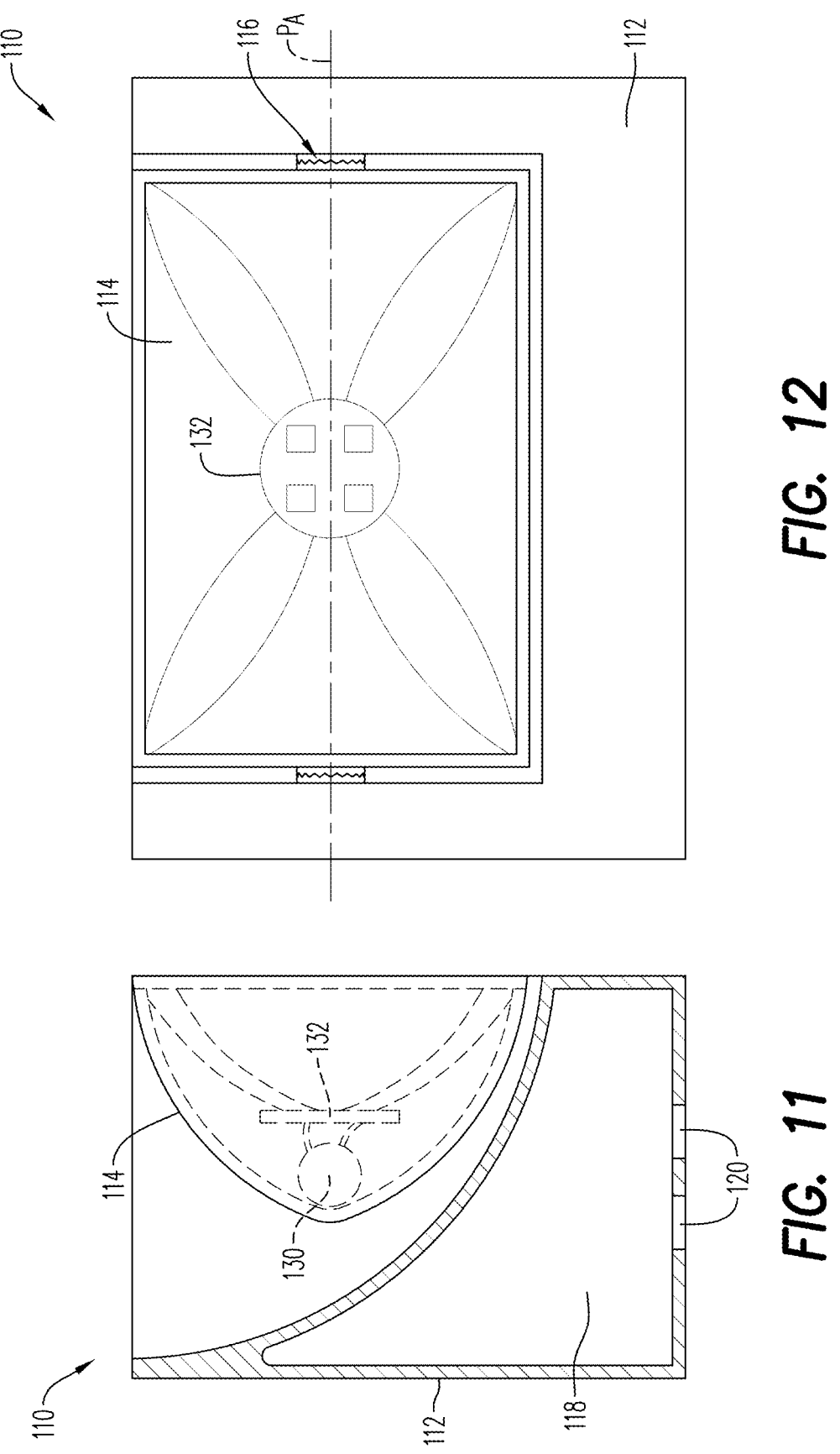
FIG. 11 is a partial sectional view of the fixture of FIG. 10 in a first position.
FIG. 12 is a front view of the fixture of FIG. 10 in the first position.

An alternate embodiment of the fixture according to the present disclosure is shown in FIGS. 10-12 with component parts performing similar or analogous functions being labeled in multiples of one hundred to the embodiment of FIGS. 1-9. Here, fixture 110 is shown having a generally polygonal shape.

Fixture 110 includes mounting portion 112, emitting portion 114, and pivot connection 116 that pivotally connects the portions to one another. In some embodiments, fixture 110 can includes two pivot connections 116, at either side of emitting portion 114. Emitting portion 114 can be any configured to emit any desired signal such as light, sound, any combinations thereof.

Mounting portion 112 includes chamber 118, which is a space inside of the mounting portion of sufficient size to allow for connecting of multiple signal conductors to one another within the chamber. Further, emitting portion 114 houses an emitter receiving chamber 130 that receives an emission source 132. Advantageously, fixture 110 includes the passage passing between chambers 118, 130 through pivot connection 116 in the manner described above with respect to fixture 10.

Another alternate embodiment of the fixture according to the present disclosure is shown in FIGS. 13-18c with component parts performing similar or analogous functions being labeled in multiples of two hundred to the first embodiment of FIGS. 1-9. Here, fixture 210 is shown having a generally polygonal shape.

Advantageously, fixture 210 is configured to selective movement amount a number of different positions so as to change a position of emitting portion 214 with respect to mounting portion 212 about a horizontal or pivot axis (Pa) and about a vertical or rotational axis (Ra).

Figure 13:
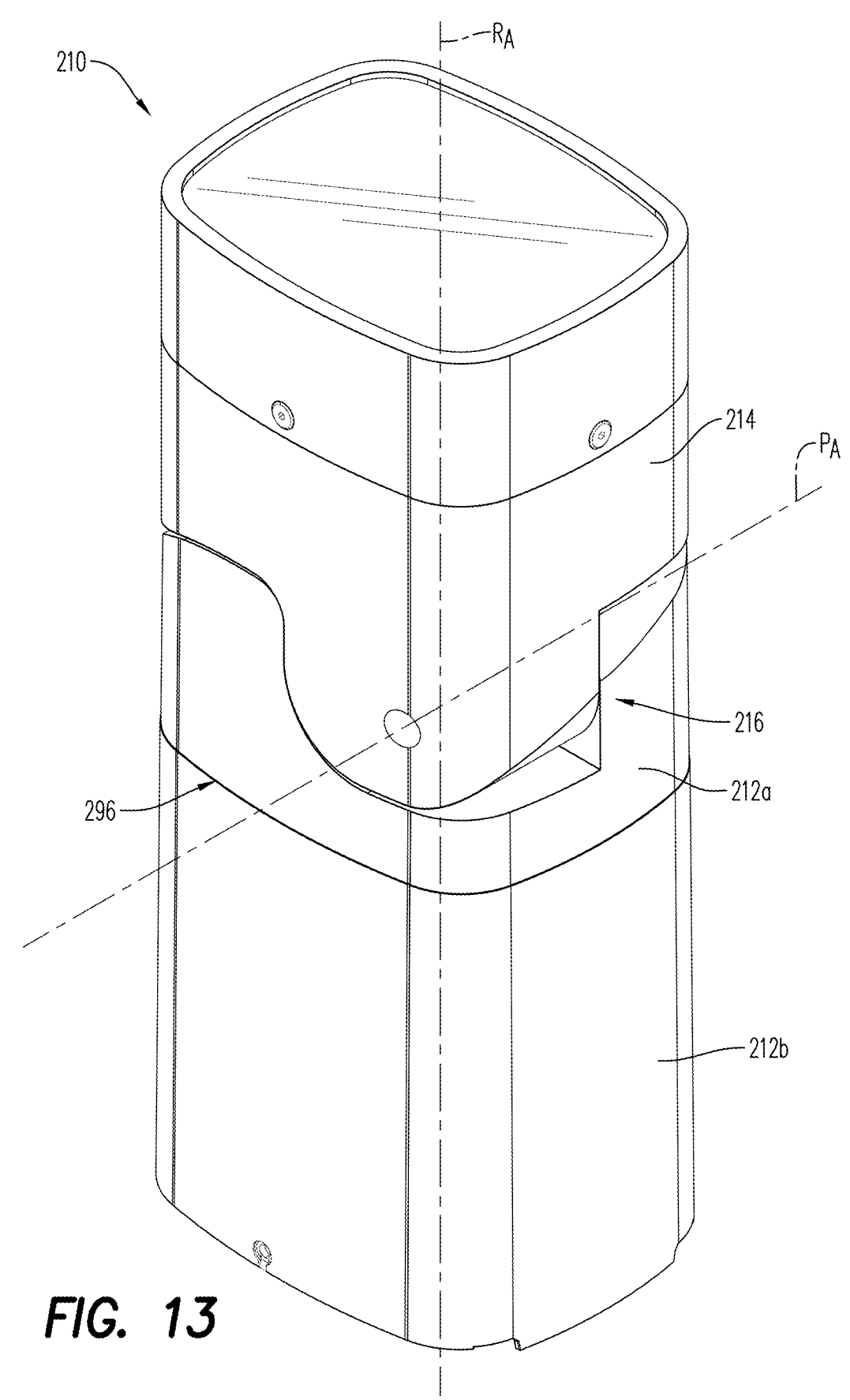
FIG. 13 is a perspective view of another exemplary embodiment of an electrical fixture according to the present disclosure in a first position.
Figure 14:
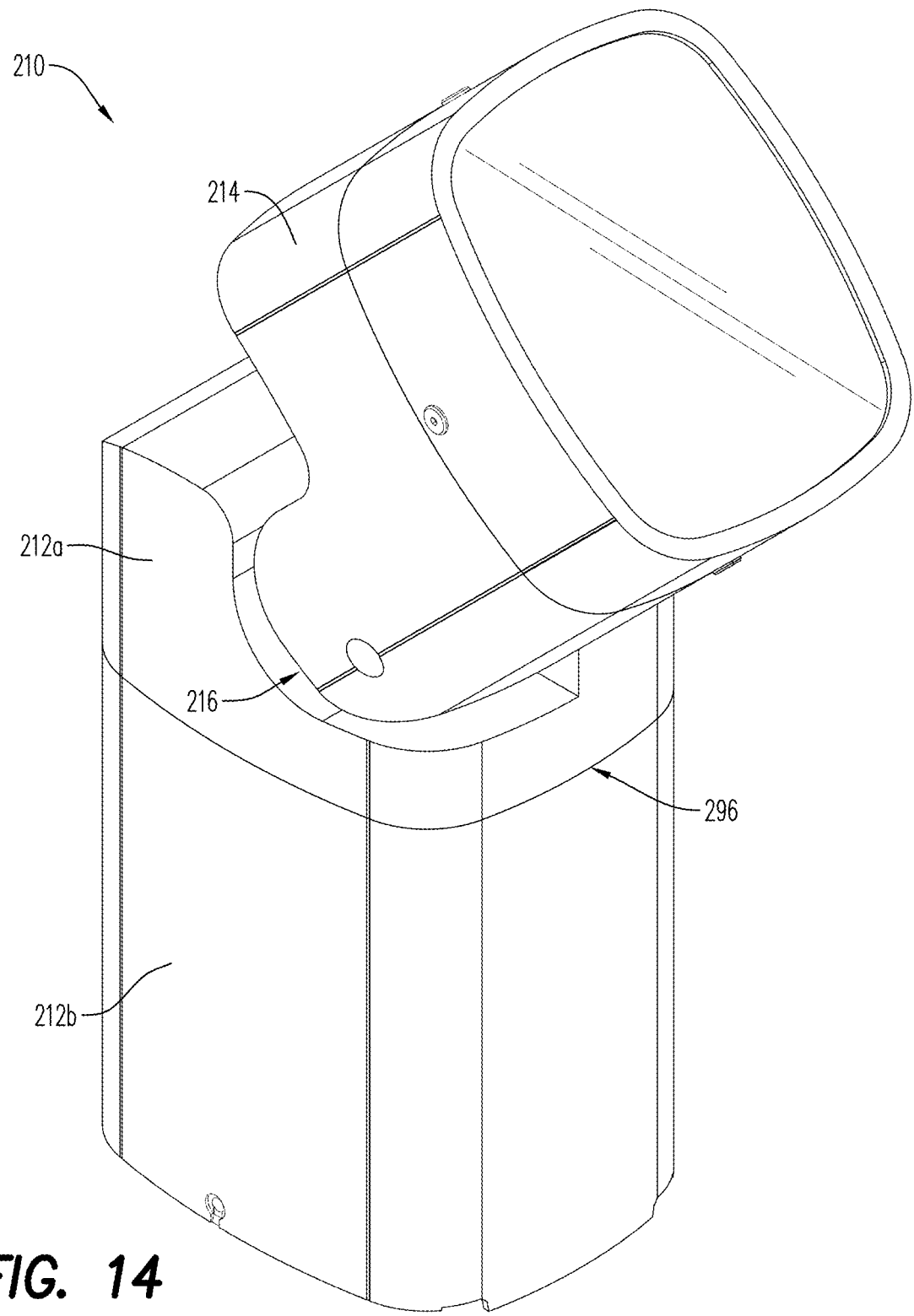
FIG. 14 is a perspective view of the fixture of FIG. 13 in a second position.
Figure 15:
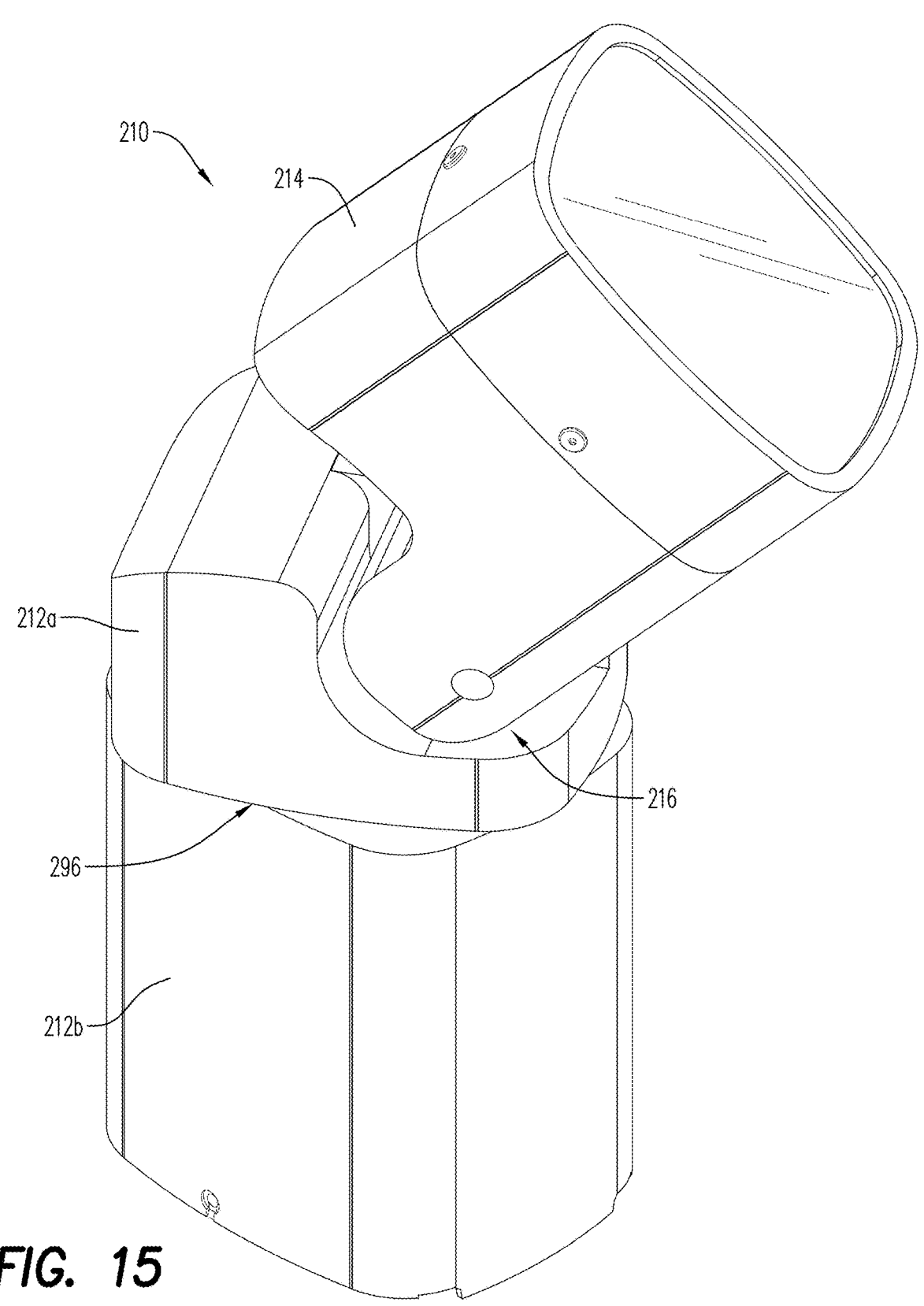
FIG. 15 is a perspective view of the fixture of FIG. 13 in a fifth position.

Referring now to FIGS. 13-15, fixture 210 includes a mounting portion 212, an emitting portion 214, a pivot connection 216, and a rotational connection 296. As in the other embodiments, emitting portion 214 can be any configured to emit any desired signal such as light, sound, any combinations thereof.

Mounting portion 212 is divided into two sections, an upper section 212a and a lower section 212b. Pivot connection 216 pivotally connects upper section 212a to emitting portion 214 for pivoting movement about pivot axis (Pa). Rotational connection 296 rotationally connects upper section 212a and lower section 212b to one another for rotational movement about rotational axis (Ra).

Fixture 210 is shown in FIG. 13 in a first position with respect to both the pivot axis (Pa) and the rotational axis (Ra). Fixture 210 is shown in FIG. 14 having been moved to a second position by movement about the pivot axis (Pa) and in FIG. 15 having been moved to another position by movement about the pivot axis (Pa) and the rotational axis (Ra).

It should be appreciated that fixture 210 is configured, via connections 216, 296, to be separately movable about the pivot and rotational axes (Pa, Ra), respectively. Thus, and while not illustrated, it is contemplated by the present disclosure for fixture 210 to be moved only about rotational axis (Ra).

Lower section 212b of mounting portion 212 can, in some embodiments, function as a wiring chamber positioned and configured to allow fixture 210 to be wired in a serial or daisy chain manner to one or more other fixtures in the manner discussed in detail above. Thus and for the sake of brevity, various portions of fixture 210 related to the wiring chamber have been omitted.

In other embodiments, lower section 212b of mounting portion 212 can function as a power post cover for use with the power post described in Applicant's own U.S. Application 63/084,629 and International Application No. PCT/US21/52599, the contents of both of which are incorporated herein by reference. Here, the lower section 212b can slide over and operatively engage—both mechanically and electrically—with a power post (not shown).

Fixture 210—much like fixture 10 disclosed above—can be configured so that pivot connection 216 and/or rotational connection 296 are substantially concealed by mounting and emitting portions 212, 214.

With respect to pivot connection 216, "substantially concealed" shall mean that the pivot connection 216 is revealed along the circumference of fixture 210 between about 0 degrees and degrees, more preferably between 3 to 40 degrees, with between 5 and 25 degrees being most preferred, and any subranges therebetween.

Further and with respect to rotational connection 296, "substantially concealed" shall mean that the rotational connection 296 is revealed by upper and lower sections 212a, 212b of mounting portion 212 less 0 degrees and 45 degrees, more preferably between 3 to 40 degrees, with between 5 and 25 degrees being most preferred, and any subranges therebetween. In the illustrated embodiment, only the part line between upper and lower sections 212a, 212b is shown such that rotational connection 296 is completely concealed.

Advantageously, fixture 210 includes a passage that begins in the chamber of lower section 212b, passes to upper section 212a through rotational connection 296, then passes to a chamber in the emitting portion 214 through pivot connection 216—all without passing through the exterior of the fixture.

Figure 16A:
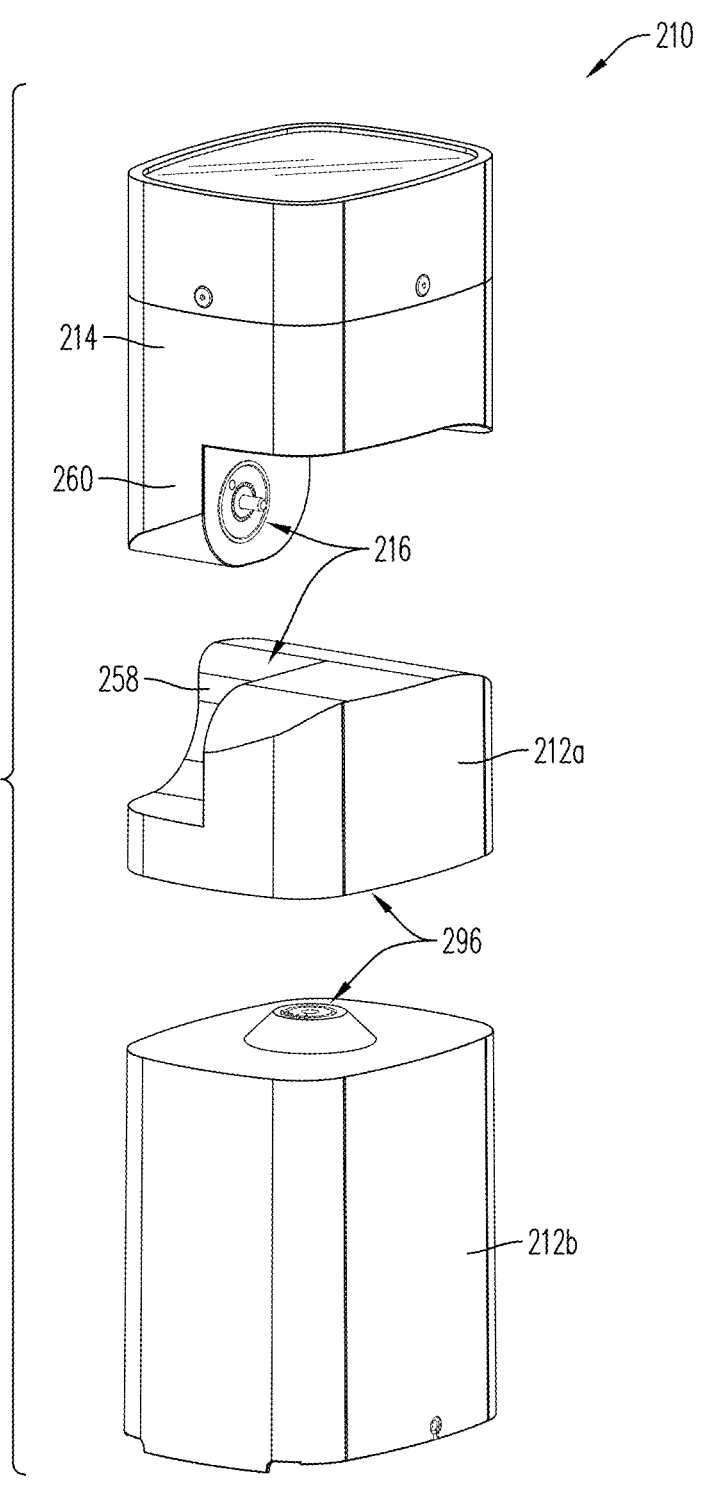
FIGS. 16a-16c are perspective exploded views of the fixture of FIG. 13.
Figure 16B:
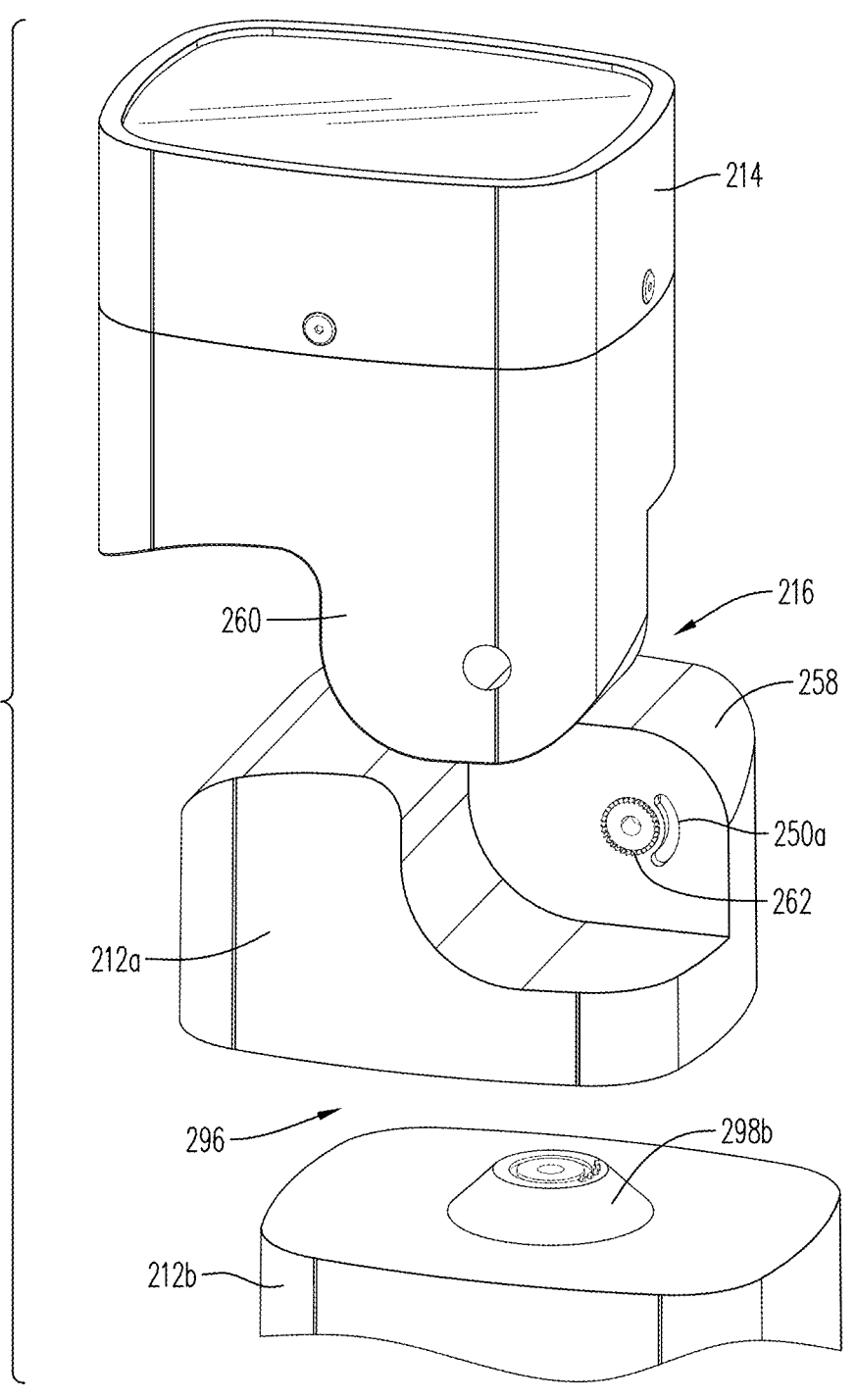
Figure 16C:
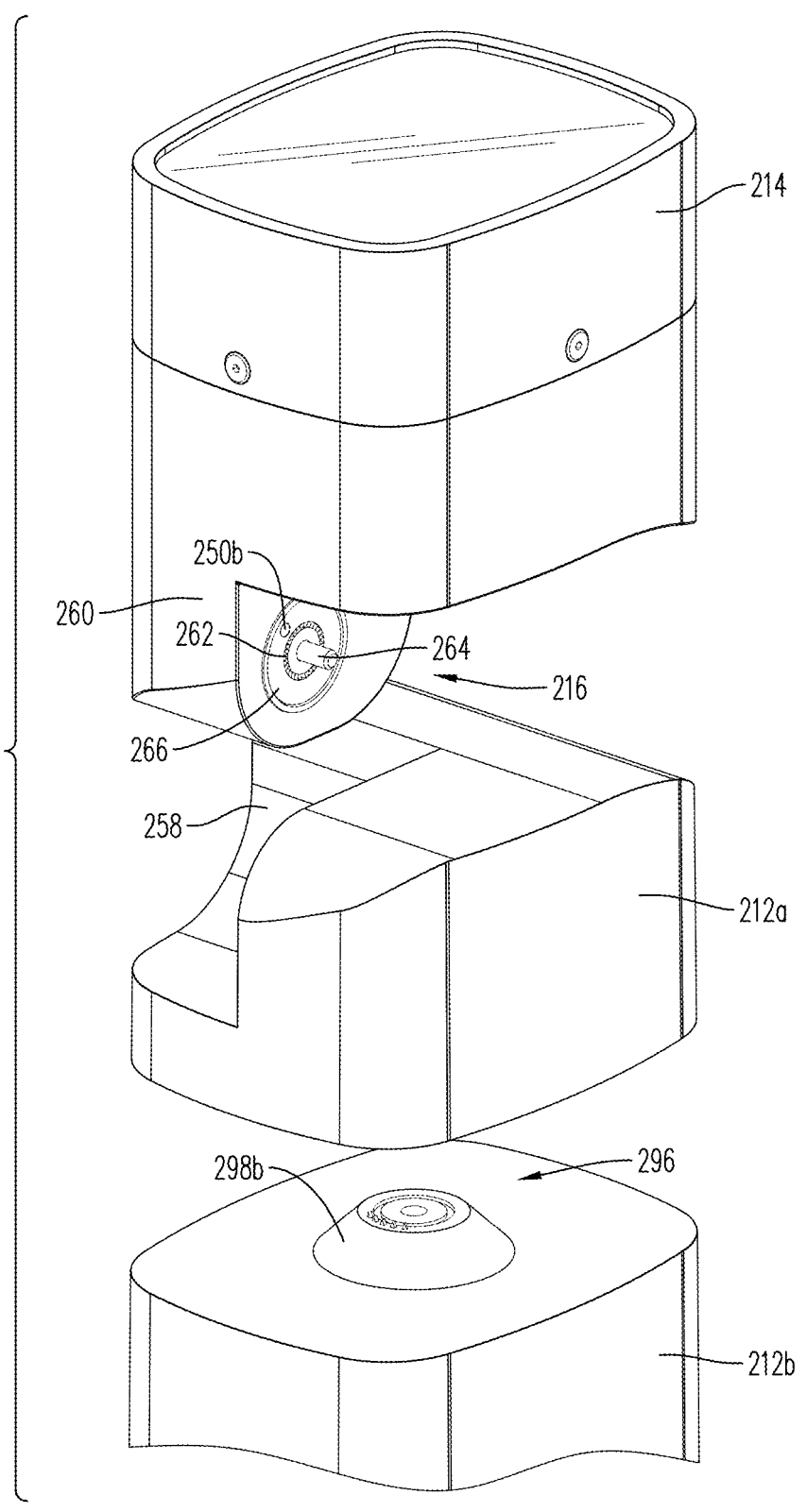

Pivot connection 216 is described in more detail with simultaneous reference to FIGS. 16a-16c.

Upper section 212a of mounting portion 212 has a first region 258 of pivot connection 216 and emitting portion 214 has a second region 260 of the pivot connection.

In some embodiments, first and second regions 258, 260 have intermeshing gears 262, which define a plurality of discrete pivotal positions about pivot axis ($P_A$). Of course, any desired interconnection between the first and second regions 258, 260 is contemplated by the present disclosure.

Pivot connection 216 includes a threaded fastener 264 that passes along pivot axis ($P_A$) to secure gears 262 in any desired position. Fastener 264 can be selectively loosened so that pivot connection 216 can allow portions 212a, 214 to pivot with respect to one another or selectively tightened so that the pivot connection prevents the portions 212, 214 from pivoting with respect to one another.

Pivot connection 216 further includes a passage for signal conduits defined by a first passage 250a of first region 258 and a second passage 250b of second region 260. One or more of sections 250a, 250b (only one shown) can be elongated to provide clearance for the signal conduit during movement of pivot connection 216.

In some embodiments, the tightening of fastener 264 defines a weather tight chamber by pressing mating surfaces of regions 258, 260 against one another. In this manner, the passage formed by passages 250a, 250b remain protected from the ingress of water and other elements at pivot connection 216.

In some further embodiments, fixture 210 can also include a gasket 266 in pivot connection 216 that is positioned at least around passages 250a, 250b to provide a weather tight seal between region 258, 260. Gasket 266 can be positioned in relief in the mating surfaces of first region 258 and/or second region 260.

Thus in embodiments either with or without gasket 266, the passage through regions 258, 260 defines a weather tight chamber such that the passage of a conduit through pivot connection 216 is considered by the present application as not passing through an exterior of electrical fixture 210.

Rotational connection 296 is described in more detail with simultaneous reference to FIGS. 17-18c.

Upper section 212a has a first region 298a of rotational connection 296 and lower section 212b has a second region 298b of the rotational connection.

In some embodiments, first and second regions 298a, 298b have intermeshing gears 298c, which define a plurality of discrete positions about rotation axis $(R_A)$. Of course, any desired interconnection between the first and second regions 298a, 298b is contemplated by the present disclosure.

Rotation connection 296 includes a threaded fastener 284 that passes along rotation axis $(R_A)$ to secure gears 298c in any desired position. Connection 296 further includes a biasing member 286—shown by way of example as a compression spring—positioned to normally bias upper and lower sections 212a, 212b into contact with one another, and thus, to normally engage gears 298c.

Rotation connection 296 can be adjusted by pulling upper and lower sections 212a, 212b away from one another with force sufficient to overcome biasing member 286 until gears 298c are unmeshed—such that the upper and lower sections can be rotated with respect to one another about rotation axis $(R_A)$. Once positioned, the pulling force on upper and lower sections 212a, 212b can be released such that biasing member 286 biases upper and lower sections 212a, 212b into contact with one another, and thus, to re-engage gears 298c.

In some embodiments, rotation connection 296—much like pivot connection 216—defines a weather tight chamber such that the passage of a conduit between upper section 212a and lower section 212b through the rotation connection 296 occurs without passing through an exterior of electrical fixture 210.

Figure 17A:
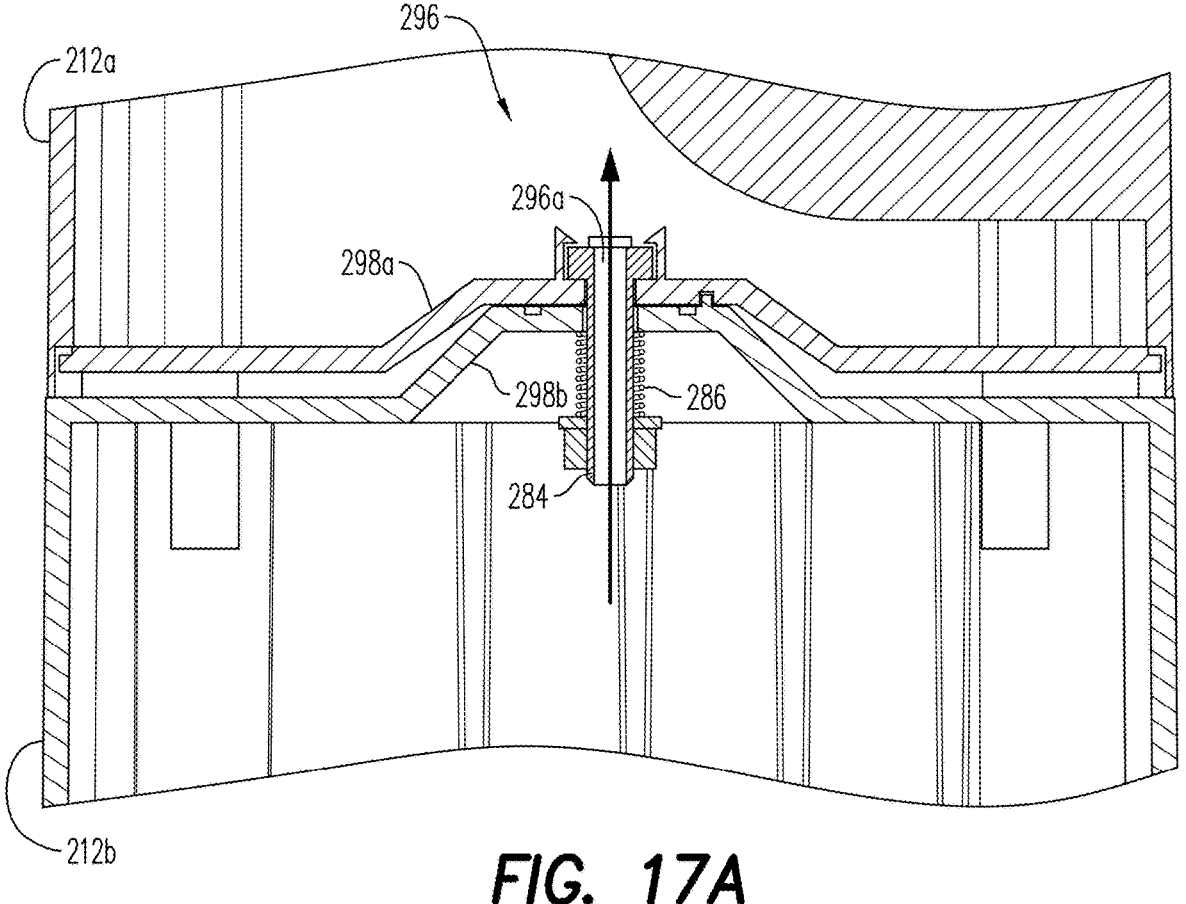

In one embodiment shown in FIG. 17a, rotation connection 296 includes a passage 296a formed through fastener 284. Here, fastener 284 can be hollow so as to allow for a conduit to pass through passage 296a between upper section 212a and lower section 212b through the rotation connection 296 without passing through an exterior of electrical fixture 210.

Figure 17B:
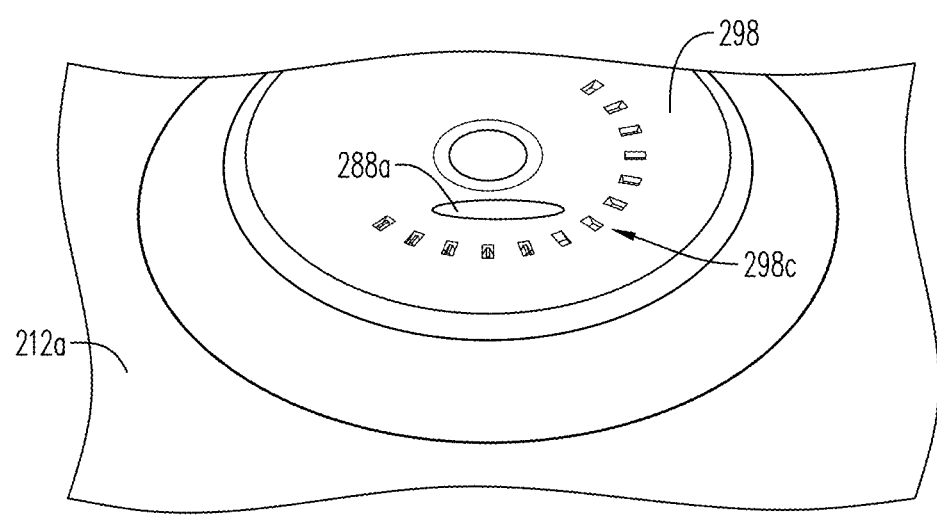
Figure 17C:
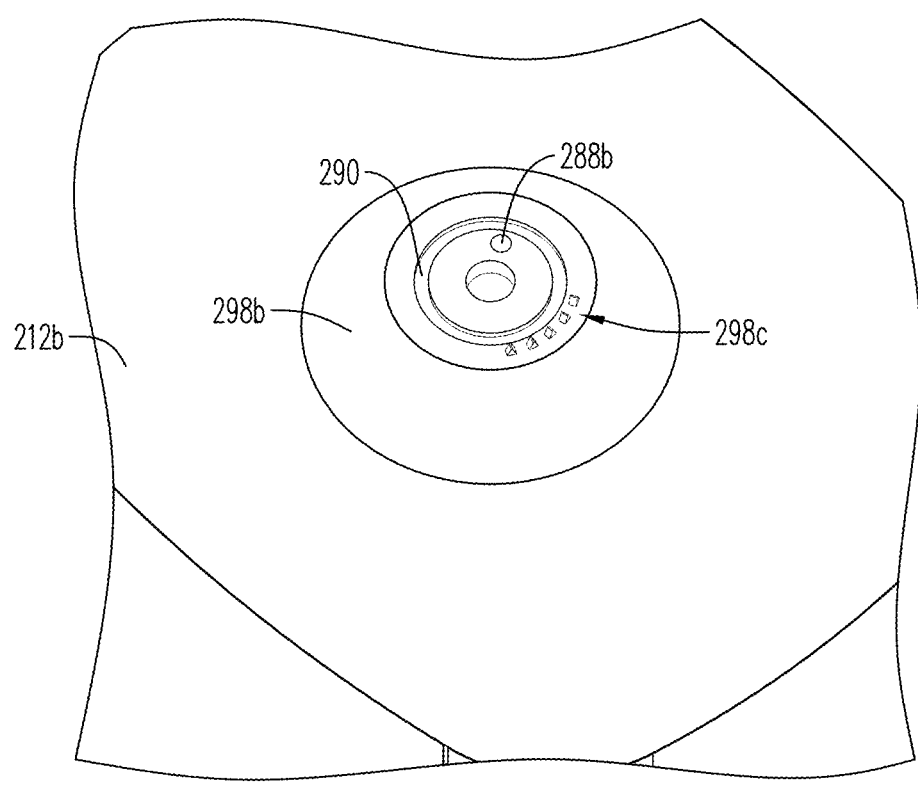

In another embodiment shown in FIGS. 17b and 17c, rotation connection 296 includes first passage 288a of first region 298a and a second passage 288b of second region 298b. One or more of passages 288a, 288b (only one shown) can be elongated to provide clearance for the signal conduit during movement of rotation connection 296. In this manner, a conduit can be passed between upper section 212a and lower section 212b through passages 288a/288b without passing through an exterior of electrical fixture 210.

In some embodiments, the biasing member 286 defines a weather tight chamber by pressing mating surfaces of regions 298a, 298b against one another. In this manner, the passage formed by passages 288a, 288b remain protected from the ingress of water and other elements at rotation connection 296.

In some further embodiments, fixture 210 can also include a gasket 290 in rotation connection 296 that is positioned at least around passage 296a or passages 288a, 288b to provide a weather tight seal between regions 298a, 298b. Gasket 290 can be positioned in relief in the mating surfaces of first region 298a and/or second region 298b.

Of course other pivoting and rotational connections 216, 296 are contemplated by the present disclosure such that such connections allow the conduit to pass through fixture 210 without passing through to the exterior of the fixture.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

| PARTS LIST |
| --- |
| electrical fixture 10 |
| mounting portion 12 |
| emitting portion 14 |
| pivot connection 16 |
| wiring chamber 18 |
| openings 20 |
| member 22 |
| bottom cap 24 |
| set screw 26 |
| gasket 28 |
| emitter receiving chamber 30 |
| emission source 32 |
| lens cover 34 |
| reflector 36 |
| seal 38 |
| cap 40 |
| reveal line 42 |
| gaps 44 |
| passage 50 |
| first end 52 |
| extension 54 |
| second end 56 |
| first section 58 |
| second section 60 |

-continued

PARTS LIST gears 62
pivot axis (P$_A$)
threaded fastener 64
gasket 66
inner mating surface 68
inner mating surface 70
outer mating surface 78
outer mating surface 80
electrical fixture 110
mounting portion 112
emitting portion 114
pivot connection 116
chamber 118
emitter receiving chamber 130
emission source 132
passage 150
fixture 210
mounting portion 212
upper section 212a
lower section 212b
emitting portion 214
pivot connection 216
first passage 250a
second passage 250b
first region 258
second region 260
intermeshing gears 262
threaded fastener 264
gasket 266
threaded fastener 284
biasing member 286
first passage 288a
second passage 288b
gasket 290
rotational connection 296
passage 296a
first region 298a
second region 298b
gears 298c

What is claimed is:

1. An electrical fixture, comprising:

a mounting portion having a first chamber and an opening passing from the first chamber to an exterior of the electrical fixture;

an emitting portion having a second chamber;

a pivot connection securing the mounting and emitting portions to one another for movement with respect to one another about a pivot axis;

a pivot passage having a first end that begins in the first chamber, an extension passing from the first chamber through the pivot connection without passing through the exterior of the electrical fixture, and a second end that terminates in the second chamber, a rotational connection securing upper and lower sections of mounting portion to one another for movement with respect to one another about a rotation axis, the rotation axis being perpendicular to the pivot axis a pivot passage having a first end that begins in the first chamber, an extension passing from the first chamber through the pivot connection without passing through the exterior of the electrical fixture; and a rotational passage that extends between the upper and lower sections of the mounting portion without passing through the exterior of the electrical fixture.

2. The electrical fixture of claim 1, wherein the first chamber has an internal volume of between 5 and 100 cubic inches.

3. The electrical fixture of claim 1, wherein the mounting portion and the emitting portion have a shape selected from a group consisting of: a cylindrical shape, an ovoid shape, a polygonal shape, a curvilinear shape, an organic shape, a primitive shape, and any combinations thereof.

4. The electrical fixture of claim 1, wherein the lower section of the mounting portion has the first chamber and the opening passing from the first chamber to the exterior of the electrical fixture.

5. The electrical fixture of claim 1, wherein the mounting portion, the emitting portion, and the pivot connection are configured so that the pivot connection is substantially concealed by the mounting and emitting portions.

6. The electrical fixture of claim 1, wherein the pivot passage and the rotational passage are weather tight.

7. The electrical fixture of claim 1, wherein the rotational connection further comprises a biasing member positioned to normally bias the upper and lower sections of the mounting portion into contact with one another.

8. The electrical fixture of claim 1, further comprising an emission source in the second chamber, wherein the emission source is selected from a group consisting of a light source, a sound source, a power source, a wireless antenna, a wireless emitter, a female connector, and any combinations thereof.

9. The electrical fixture of claim 8, wherein the emission source is a light source selected from a group consisting of an incandescent lamp, a fluorescent lamp, a light emitting diode, and any combinations thereof.

10. The electrical fixture of claim 1, wherein the upper section of the mounting portion has a first region of the rotational connection and the lower section of the mounting portion has a second region of the rotational connection.

11. The electrical fixture of claim 10, wherein the first and second regions comprise intermeshing gears defining a plurality of discrete positions about the rotation axis.

12. The electrical fixture of claim 1, wherein the rotational connection comprises a threaded fastener having the rotational passage through the threaded fastener.

13. The electrical fixture of claim 12, wherein the rotational connection further comprises a biasing member positioned to normally bias the upper and lower sections of the mounting portion into contact with one another.

14. The electrical fixture of claim 1, wherein the upper section of the mounting portion has a first section of the pivot connection and the emitting portion has a second section of the pivot connection.

15. The electrical fixture of claim 14, wherein the pivot connection further comprises intermeshing gears at the first and second sections that define a plurality of discrete pivotal positions about the pivot axis.

16. The electrical fixture of claim 14, wherein the first and second sections each comprise inner mating surfaces and each comprise outer mating surfaces.

17. The electrical fixture of claim 16, wherein the seal comprises a gasket positioned between the inner mating surfaces of the first and second sections.

18. The electrical fixture of claim 16, wherein the inner mating surface of the first section is spaced along the pivot axis from the outer mating surface of the first section, and wherein the inner mating surface of the second section is spaced along the pivot axis from the outer mating surface of the second section.

19. The electrical fixture of claim 18, further comprising a threaded fastener in the pivot passage along the pivot axis, wherein the threaded fastener passes through the pivot passage and applies a force on the outer mating surfaces of the first and second sections to urge the inner mating surfaces of the first and second sections against one another.

20. An electrical fixture, comprising:

a mounting portion having a first chamber and an opening passing from the first chamber to an exterior of the electrical fixture;

an emitting portion having a second chamber;

a connection securing the mounting and emitting portions to one another for movement with respect to one another; and a passage having a first end that begins in the first chamber, an extension passing from the first chamber through the connection without passing through the exterior of the electrical fixture, and a second end that terminates in the second chamber, wherein the mounting portion comprises an upper section and a lower section, the lower section having the first chamber and the opening passing from the first chamber to the exterior of the electrical fixture, wherein the connection comprises:

a pivot connection allowing movement of the upper section of the mounting portion and the emitting portion with respect to one another about a pivot axis; and/or a rotational connection allowing movement of the upper and lower sections of mounting portions with respect to one another about a rotation axis; and wherein the rotational connection further comprises a threaded fastener passing along the rotation axis and a biasing member positioned to normally bias the upper and lower sections of the mounting portion into contact with one another.

21. A method of serially connecting electrical fixtures, comprising:

providing a first electrical fixture having a mounting portion, an emitting portion, and a pivot connection configured to allow movement of the mounting and emitting portions with respect to one another about a pivot axis, and a rotational connection configured to allow movement of upper and lower sections of the mounting portion with respect to one another about a rotational axis that is perpendicular to the pivot axis;

passing a conductor and a second conductor into a chamber of the lower section of the mounting portion from an exterior of the first electrical fixture;

passing a third conductor from the chamber of lower section of the mounting portion through a rotational passage of the rotational connection into the upper section of the mounting portion without passing through the exterior;

passing the third conductor from the upper section of the mounting portion to the emitting portion through a pivot passage of the pivot more connection without passing through the exterior;

interconnecting the first, second, and third conductors to each other in the chamber; and interconnecting an end of the second conductor that is exterior to the wiring chamber to a second electrical fixture.

* * * * *